United States Patent [19]

Koeslin

[11] 4,179,884
[45] Dec. 25, 1979

[54] WATERCOOLED EXHAUST MANIFOLD AND METHOD OF MAKING SAME

[75] Inventor: Werner H. Koeslin, Peoria, Ill.
[73] Assignee: Caterpillar Tractor Co., Peoria, Ill.
[21] Appl. No.: 822,846
[22] Filed: Aug. 8, 1977
[51] Int. Cl.$^2$ .............................. F01N 7/06; F01N 7/10
[52] U.S. Cl. .................................... 60/321; 29/157 R; 29/455 R; 60/322; 60/323
[58] Field of Search ............... 29/156.4 R, 156.4 WL, 29/157 R, 455; 60/282, 322, 321, 323; 285/41

[56] References Cited

U.S. PATENT DOCUMENTS

| | | | |
|---|---|---|---|
| 2,125,703 | 8/1938 | Williams | 285/41 |
| 2,886,945 | 5/1959 | Hofer | 60/321 |
| 3,169,365 | 2/1965 | Benjamen | 60/321 |
| 3,324,533 | 6/1967 | Watteau | 60/321 |
| 3,581,494 | 6/1971 | Scheiflin | 60/282 |
| 3,750,403 | 8/1973 | Deutschmann | 60/321 |
| 3,850,453 | 11/1974 | Bentley | 60/322 |
| 3,921,398 | 11/1975 | Kashmerick | 60/321 |

FOREIGN PATENT DOCUMENTS 2337479  2/1975  Fed. Rep. of Germany ............. 60/321

Primary Examiner—Douglas Hart
Attorney, Agent, or Firm—Wegner, Stellman, McCord, Wiles & Wood

[57] ABSTRACT

A water-cooled engine exhaust manifold has an internal exhaust conduit or heat sheild comprised of a plurality of axially shiftable sections through which the hot exhaust gases pass from the engine to a hot gas turbocharger. A casing encircles the exhaust conduit and is held in spaced relationship to the exhaust conduit so as to provide dead air space or other insulating material space for insulating the hot exhaust gases from the casing. An outer shell encircles the casing and is sealed to exhaust inlet elbows and to fluid inlet flanges to provide a water jacket to cool the surface of the casing. The exhaust inlet elbows communicate with each different section of the exhaust conduit. Clearance is provided between the ends of each section of the exhaust conduit to permit expansion and axial shifting of the sections of the exhaust conduit without, in any way, interfering with the function and operation of the fluid-cooled jacket of the manifold. A novel method for assembling the sections of the exhaust conduit and the other parts of the manifold is provided.

12 Claims, 6 Drawing Figures

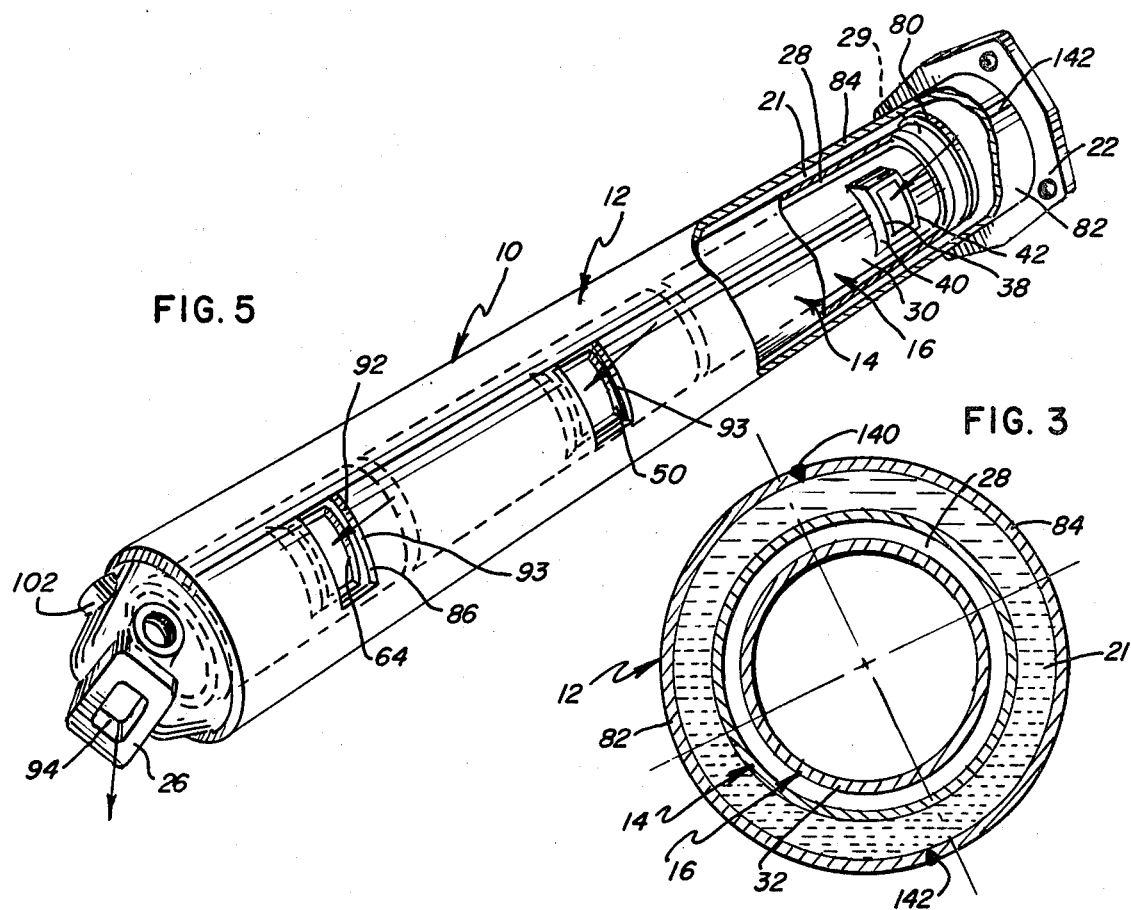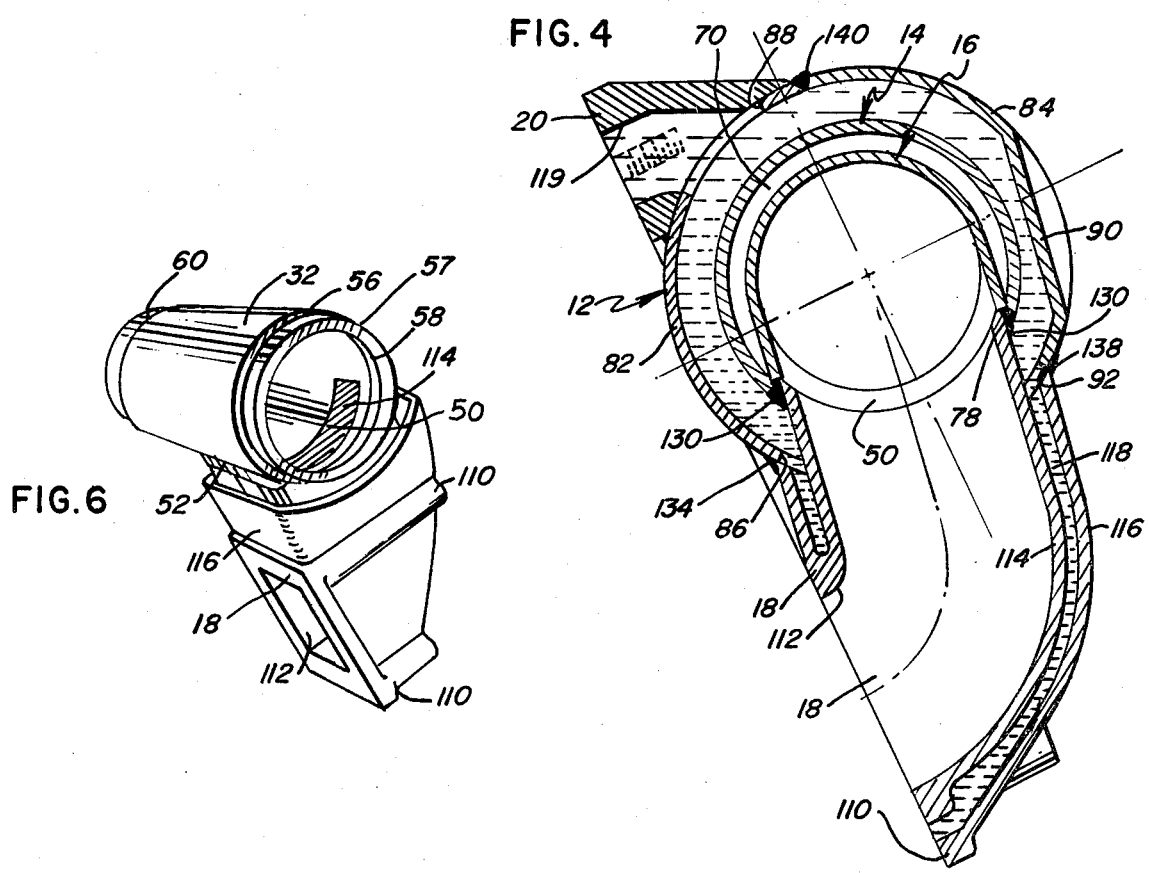

WATERCOOLED EXHAUST MANIFOLD AND METHOD OF MAKING SAME

BACKGROUND OF THE INVENTION

1. Field of the Invention

This invention relates to exhaust manifolds and, more particularly, to an insulated internal exhaust conduit for an exhaust manifold and a method of assembling same.

2. Description of the Prior Art

In modern engine technology and, in particular, for special use engines, such as unmanned marine engines, or stationary engines, and the like, turbochargers are used and are powered by the hot exhaust gases from the engine. It is desirable to convey the hot exhaust gases from the engine to the turbocharger in as high a temperature state as is possible. It is also desirable to maintain the outside temperature of the manifold below a predetermined temperature, such as below 400° F. Heretofore, water jackets have been provided about exhaust pipes for the purpose of reducing the external surface temperature of the manifold and, at the same time, to prevent fires on unmanned engines. Unfortunately, the use of water jackets reduces the temperature of the exhaust gases, thereby reducing energy supplied to the hot exhaust gas turbocharger.

Some attempts have been made to produce a manifold with a surface temperature within allowable limits and, at the same time, to maintain the temperature of the exhaust gases as high as possible. One such system provides a sleeve inside the manifold which is surrounded by an air space which air space provides insulation for the hot exhaust gases to keep their temperature as high as possible and, at the same time, to reduce the amount of heat transmitted to the water of the water jacket. That system also provides for accommodating for the heat insulating sleeve increasing in diameter under the expansion caused by the hot exhaust gases. No provision is made for expansion of the heat insulating sleeve axially of the manifold. Axial expansion of the sleeve causes misalignment of the openings connecting the manifold to the exhaust ports of the engine and causes warping and distortion of the manifold. In addition, in at least one version of said prior device, the heat insulation sleeve is cast in place in the manifold which makes it almost impossible to replace the heat insulation sleeve when it deteriorates or fails.

In one other prior art device, insulation material is provided around a heat insulating sleeve and a specially designed sliding connection is provided between the sleeve and a tube extending from each exhaust port of the engine. These connections are complicated, expensive and almost impossible to maintain and service.

In another prior art device, heat insulation is provided between the inner sleeve and an intermediate sleeve, with the inner sleeve being capable of axial movement against specially designed collapsible gaskets located between adjoining ends of the sleeves.

Still another prior art device provides a manifold wherein the outer shell of the manifold is made in two parts which parts are assembled around an inner shell of the manifold so as to form a water jacket for cooling the inner shell with no insulation being provided for the inner shell.

SUMMARY OF THE INVENTION

The present invention is directed to overcoming one or more of the problems as set forth above.

According to the present invention, an internal exhaust conduit having a plurality of sections is provided, with each section being in communication with one exhaust port of an engine. The sections of the internal exhaust conduit are axially shiftable with respect to each other without any seals being provided between adjoining sections. Flanges are formed on the external surface of the sections which contact the inner surface of an intermediate casing, thereby providing heat insulating dead air spaces between the exhaust conduit and the casing. A two-part outer shell is assembled over the intermediate casing, which outer shell has fluid inlet flanges connected to the cooling system of the engine for communicating coolant into the space between the casing and the outer shell. Water-cooled exhaust inlet elbows are connected to the exhaust ports of the engine and are welded to the edges of openings through the outer shell and are welded to openings in the intermediate casing. The end portion of each elbow fits freely into a socket formed around each opening into the internal exhaust conduit.

Exhaust gases from the engine are conveyed through the inlet elbows into the internal exhaust conduit and pass through the internal exhaust conduit directly into the inlet of the turbocharger. The adjoining sections of the internal exhaust conduit nest with each other with sufficient clearance that each section can expand axially with respect to its adjoining section without interference. The dead air space surrounding the sections of the exhaust conduit acts as an insulation for holding the maximum amount of heat in the exhaust gases. The coolant circulating in the space between the casing and the outer shell and in the inlet elbow maintains the outside temperature of the manifold below the predetermined value.

A novel method of assembling the manifold is provided which includes interfitting the plurality of sections of the exhaust conduit end-for-end, which exhaust conduit is then inserted into the intermediate casing with the openings in each individual section of the exhaust conduit aligning with an appropriate opening in the casing. An exhaust inlet elbow is inserted through each opening in the casing and is seated in the undercut aligned opening of the exhaust conduit. Each elbow is then secured to the edge of the appropriate opening in the casing. The casing is sealed off at one end and mating halves of an outer shell are then assembled over the assembled casing and elbows with each elbow secured to the shell and with the halves of the shell secured together. Water inlet fittings are secured in place in alignment with openings into the shell. A flanged-end cap is secured on one end of the outer shell whereby the water coolant can flow through the end cap into a heat exchanger. Another elbow is secured to the outer shell and to the casing to permit water cooling of the elbow with the outlet of the elbow being connected to the inlet of the turbocharger.

BRIEF DESCRIPTION OF THE DRAWINGS

The details of construction and operation of the invention are more fully described with reference to the accompanying drawings which form a part hereof and in which like reference numerals refer to like parts throughout.

In the drawings:

FIG. 3 is a slightly enlarged cross-sectional view taken along the line 3—3 of FIG. 1;

FIG. 4 is an enlarged cross-sectional view taken along the line 4—4 of FIG. 1;

FIG. 5 is a perspective view of a partially completed manifold with parts broken away and in section; and FIG. 6 is a subassembled exhaust conduit section and an associated exhaust gas manifold elbow.

DESCRIPTION OF THE PREFERRED EMBODIMENT

Figure 2:
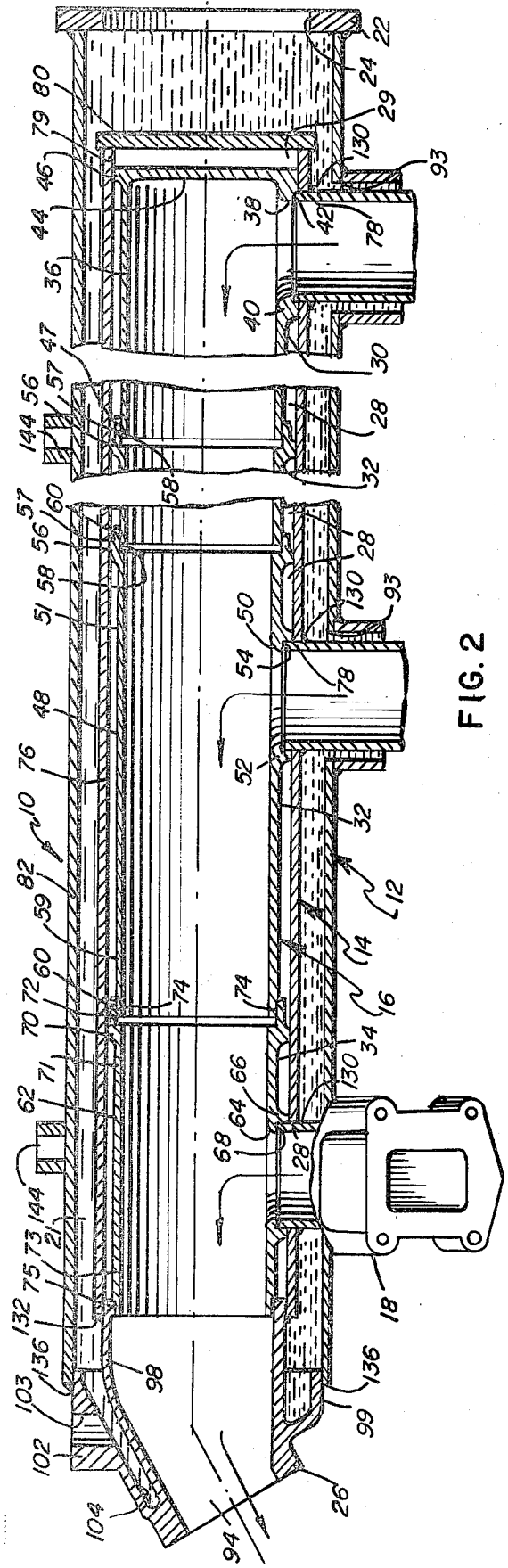
FIG. 2 is a vertical cross-sectional view taken through the manifold of FIG. 1, once again with parts broken away.
Figure 1:
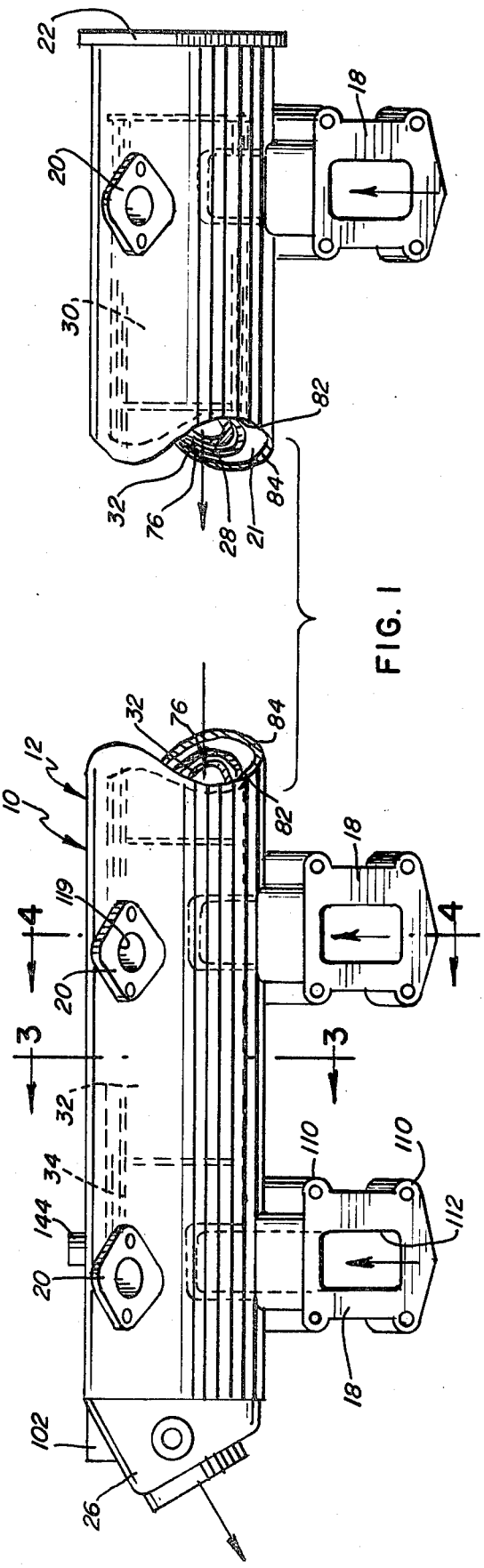
FIG. 1 is an elevational view of an assembled manifold partially broken away in a midportion thereof and incorporating the invention therein.

Referring to the drawings, and in particular FIGS. 1 and 2 thereof, an improved engine exhaust manifold 10 is illustrated which is comprised of an outer shell 12, an intermediate casing 14 and an internal exhaust conduit or heat shield 16. Individual exhaust gas directing means or inlet elbows 18 are connected through the outer shell 12 and intermediate casing 14 to the interior of the internal exhaust conduit 16 for conveying hot exhaust gases from the exhaust ports of the cylinders of an engine (not shown) to and through the manifold 10 and into an exhaust gas turbocharger (not shown). Coolant inlet flanges 20 are connected to and through the outer shell 12 for conveying cooling fluid to a cavity or cooling jacket 21 formed by the outer shell 12 and the intermediate casing 14 of the manifold 10. A plate 22 is secured to one end of the outer shell 12 and has an aperture 24 therethrough which permits the coolant in the cavity 21 to flow directly into a heat exchanger or the like. The other end of the outer shell 12 has an angled fluid cooled elbow 26 secured thereto for directing the exhaust gases from the internal exhaust conduit 16 into the exhaust gas turbocharger. Compartmentalized dead air insulating spaces 28 are provided between the internal exhaust conduit 16 and the intermediate casing 14 so as to reduce the heat transfer from the hot exhaust gases to the cooling fluid in the cooling jacket 21 and to the outer shell 12. On turbocharged engines, the internal exhaust conduit reduces exhaust gas energy loss resulting in improved engine performance. Reduced manifold heat rejection to the jacket coolant permits the use of smaller cooling components, such as heat exchangers, keel coolers and radiators.

More specifically, the internal exhaust conduit or heat shield 16 is comprised of, in the illustrated embodiment, at least three different types of sections, namely a closed-end section 30, one or more center sections 32 and an open-end section 34. Each section is preferably investment cast of stainless steel. The closed-end section 30 consists of a cylindrically-shaped body portion 36 having a rectangularly-shaped aperture 38 formed in the wall near one end portion thereof. The aperture 38 is bounded by a radially outwardly projecting flange 40 which has a radially outwardly facing recess 42 formed therein. The end of the cylindrical body 36 near the aperture 38 has an end wall 44 closing off the inside of the body 36 and has a radially extending continuous rib or flange 46 formed around the outer periphery thereof. The flange 46 projects a uniform distance radially outward from the outer surface of the body 36 of the closed-end section 30. The open end of the body 36 has a lip 47 formed in the outer peripheral surface thereof which lip has a slightly reduced diameter from the diameter of the body 36.

The exhaust conduit or heat shield 16 has one or more center sections 32 which consist of an elongated cylindrically-shaped body portion 48 with a rectangularly-shaped aperture 50 formed offcenter through the wall thereof. A radially outwardly projecting flange 52 is formed around the outer periphery of the aperture 50 which flange 52 has a radially outwardly facing recess 54 formed therein. On the end portion 51 of the body 48, nearest to the aperture 50, is a radially extending continuous rib or flange 56 formed about the outer periphery thereof. An axially extending sleeve 57 is integrally formed on the body 48 to project beyond the flange 56 and has an undercut reduced diameter portion or socket 58 formed therein which axially faces away from the body 48 of the center section 32. As shown in FIG. 2, the reduced diameter lip 47 on the closed-end section 30 slidably nests in the undercut portion or socket 58 of the center section 32. The other end portion 59 of the center section 32 has a lip 60 formed in the outer peripheral surface thereof, which lip 60 has a diameter slightly reduced from the diameter of the body 48 of said section 32. In the event two center sections 32 are used, such as shown in FIG. 2, the lip 60 on one end portion 59 of one center section 32 will nest in the undercut portion or socket 58 of the adjoining center section 32. The lip 47 on the open end of the closed-end section 30 slidably nests in the undercut end portion or socket 58 of the adjoining center section 32.

The open-end section 34 of the exhaust conduit 16 has a cylindrical body 62 with a rectangularly-shaped aperture 64 formed through the wall thereof substantially centrally of the ends of said section. A radially outwardly projecting flange 66 is formed around the outer periphery of the aperture 64 which flange has a radially outwardly facing recess 68 formed therein. A radially extending continuous rib or flange 70 is formed around the outer periphery of one end portion 71 of the open-end section 34 and has an axially extending sleeve 72 integrally formed on the body 62 to project beyond the flange 70. An undercut reduced diameter portion or socket 74 is formed in said sleeve 72 and is adapted to slidably receive the lip 60 on the adjoining center section 32. The other end portion 73 of the open-end section 34 has a lip 75 formed in the outer peripheral surface thereof, which lip 75 has a diameter slightly reduced from the diameter of the body 62 of said section 34. The continuous ribs or flanges 46, 56 and 70 all project radially outward from the surfaces of the respective sections 30, 32 and 34 an equal amount, with the outer surfaces of said flanges being circular and concentric with respect to the outer circumference of the sections 30, 32 and 34.

An elongated intermediate casing 14 is provided and has a cylindrically-shaped body portion 76 with a plurality of substantially equally spaced apart, rectangular-shaped apertures 78 formed through the wall thereof. The apertures 78 are axially aligned with each other along one wall of the casing 14. The exhaust conduit 16 is assembled in the intermediate casing 14 with the apertures 78 in the casing aligned with apertures 38, 50 and 64 in the exhaust conduit 16. The flanges 46, 56 and 70 contact the inner surface of the casing 14 to create segmented dead air spaces 28 therebetween. The one end 79 of the casing 14 has a solid cap 80 which, at the appropriate time, is secured to the end 79 of said body 76 so as to seal that end of the casing.

The outer shell 12 of the manifold 10 is made up of two halves 82 and 84 which are adapted to be secured together along the length thereof. The half 82 is semicylindrical in shape and has along one edge thereof, rectangular cutouts 86 and has, through the opposite portion thereof, a plurality of openings 88 formed therethrough. The other half 84 has one portion thereof flattened to form a planar section 90 and also has a plurality of rectangular cutouts 92 equally spaced apart along one edge thereof, which cutouts 92 mate with the cutouts 86 formed in the mating portion of the half 82 of the shell 12. The matching cutouts 86,92 form a rectangular aperture 93 when the halves 82,84 are assembled together over the casing 14. The end plate 22 is secured to the one end of the shell 12.

Fluid inlet flanges 20 are provided for connecting the fluid cooling jacket 21 of the manifold 10 with a source of cooling fluid. Each flange 20 is secured to the shell 12 so that the passage 119 in the flange 20 communicates with one of the openings 88 formed through the shell 12. Bolt holes are provided in the flange whereby the flange 20 can be attached to a source of cooling fluid.

The outlet elbow 26 has an angled passageway 94 therethrough which is defined by an inner sleeve 98 that is adapted to slidably nest about the lip 75 on the open-end section 34. The sleeve 98 also is dimensioned to telescope into the open end of the casing 14 and to be secured thereto in a fluid-tight relationship. The elbow 26 has an outer sleeve 99 which telescopes inside the end of the shell 12 and is secured thereto, likewise, in fluid-tight relationship. A boss 102 is formed on the outer sleeve 99 and has a passage 103 therethrough which communicates with a cavity 104 formed in the elbow 26 between the sleeves 98 and 99. The cavity 104 communicates with the cavity 21 between the shell 12 and casing 14.

Cooling fluid enters the elbow 26 through the boss 102, which cooling fluid mingles with the cooling fluid entering the jacket 21 through the fluid inlet flanges 20. The cooling fluid circulates around the outer periphery of the elbow 26 to maintain the surface temperature of the elbow 26 below a specified level.

Water-cooled exhaust inlet elbows 18 are provided for each cylinder of the engine. Each exhaust inlet elbow 18 has connecting flanges 110 through which bolts pass to secure the exhaust inlet elbow 18 to the engine so as to align a passage 112 in the exhaust inlet elbow 18 with the exhaust port (not shown) of the cylinder. The exhaust inlet elbow 18 has a pair of spaced concentric walls 114 and 116 with a fluid passage 118 therebetween. The outer wall 116 terminates in a configuration to mate with the edges of the aperture 93 in the shell 12. The inner wall 114 of the elbow passes through the aperture 78 in the casing 14 and terminates in a configuration to slidably nest in one of the recesses 42, 54 or 68 in the closed-end section 30, center section 32 or open-end section 34, respectively. The wall 114 is secured to the casing 14 and the wall 116 is secured to the shell 12. The passage 118 between the walls 114 and 116 in the elbow 18 communicates with the cooling fluid in the jacket 21 between the outer shell 12 and the intermediate casing 14.

Cooling fluid, such as water, that enters the cooling jacket 21 through the coolant inlet flanges 20 circulates through the jacket 21 and through the passage 118 so as to maintain the skin temperature of the outer wall 116 of each exhaust inlet elbow 18 below the recommended temperature range, such as below 400° F.

FIG. 6 illustrates how an exhaust inlet elbow 18 slidably nests in the recess 54 in one center section 32 of the exhaust conduit 16. It is to be understood that an elbow 18 nests in the recesses in the flanges surrounding the apertures in each open-end section 34, center section 32 and closed-end section 30 of the exhaust conduit 16.

The dead air spaces 28,29 may be filled with heat insulating material if desired. The radial dimension of the ribs or flanges 46, 56, 70 can be varied so that the desired thickness of insulating material can be inserted in the spaces 28 and 29 to achieve the desired degree of insulation.

The method of assembling the exhaust manifold 10 entails the steps of selecting an intermediate casing 14 appropriate for the engine to be serviced. In the present case, it will be assumed that the engine is a V-8 engine and the manifold is to be used for the four cylinders on one side of the engine. The internal exhaust conduit 16 is assembled by selecting one open-end section 34 into the undercut portion or socket 74 of which is slid the lip 60 of one center section 32. A second center section 32 has the lip 60 slid into the undercut portion or socket 58 of the first center section 32. A closed-end section 30 has the lip 47 slid into the undercut portion or socket 58 of the second center section 32. The four-sectioned (30,32,32,34) exhaust conduit 16 is then inserted into the intermediate casing 14 with the apertures 38, 50, 50 and 64 in the respective sections 30, 32, 32 and 34 aligned with the apertures 78 in the side of the intermediate casing 14. An exhaust inlet elbow 18 is assembled through each aperture 78 by inserting the end of the inner wall 114 of the elbow through the aperture 78 in the casing 14 with the end nesting in the recess 42 in the flange 40 in the closed-end section 30. The wall 114 is welded at 130 to the edge of the aperture 78. The same method is applied with each elbow 18, that is, the end of the inner wall 114 is threaded through the apertures 78 and into the recesses 54, 54, 68 in the flanges 52, 52, 66 of the center sections 32, 32 and open-end section 34. In each case, the casing 14 is welded at 130 to the wall 114 around the apertures 78 in the casing 14. The ends of the respective walls 114 of the elbows 18 project into the recess of the respective sections 30, 32, 32, 34 of the exhaust conduit 16 now hold the sections of the exhaust conduit 16 in position in the casing 14 with the ribs or flanges 46, 56, 56 and 70 bearing against the inner surface of the casing 14 to create a plurality of segmented dead air spaces 28 surrounding the outer surface of the sections 30, 32, 32 and 34 within the casing 14. The end cap 80 is welded over the open end of the intermediate casing 14 to seal off the one end of the casing whereby a dead air space 29 is provided in the space between the end wall 44 on the closed-end section 30 and the end cap 80.

The outlet elbow 26 has the sleeve 98 inserted between the end portion of the body 76 of the casing 14 and slidably nests on the lip 75 on the end 73 of the open-end section 34 of the exhaust conduit 16. A weld is formed at 132 between the end of the casing 14 and sleeve 98. The sleeve 98 of the elbow 26 holds the end portion 73 of the open-end section 34 centered with respect to the manifold 10. Section 34 is free to move axially relative to the elbow 26.

The two halves 82 and 84 of the outer shell 12 are now assembled about the outer surface of the casing 14. That is, the cutouts 86 on the half 82 are aligned with the outer wall 116 of the elbows 18 with the wall of the cutouts 86 mating with the end of the wall 116. A weld is formed at 134 between the wall of the cutouts 86 and the wall 116 of the elbow 18. Welds are formed at 136 between the end of the half 82 and the sleeve 99 of the elbow 26. The second half 84 of the shell 12 is now assembled about the other side of the intermediate casing 14, with the one end of the half 84 being welded at 136 to the sleeve 99 of the elbow 26 and the walls 116 of each elbow 18 being welded at 138 around the cutouts 92 in the half 84. Welds 140,142 are run the full length of the two halves 82 and 84 to seal the two halves together as illustrated in FIG. 3. An apertured end plate 22 is welded to the open end of the shell 12 with the aperture 24 in the plate 22 communicating with the open space in the shell 12.

The assembly of the parts just described produces an exhaust manifold 10 which can be connected to an engine by bolting the flanges 110 of each elbow 18 to the appropriate wall of the engine. The hot exhaust gases from the exhaust ports of the cylinders of the engine pass hot exhaust gases through the passage 112 in each elbow 18. The hot gases will flow into the internal exhaust conduit 16 and will pass axially through the internal exhaust conduit 16 through the elbow 26 and into the inlet of a hot gas turbocharger. The heat from the hot exhaust gases entering the internal exhaust conduit 16 will expand the respective sections 30, 32 and 34 of the exhaust conduit 16 which sections are free to axially expand relative to each other by means of the sliding fits between the lips on each section fitting in the undercut portions or sockets of the adjoining section. In this way, no uncontrolled stresses are created by the expansion of the various sections of the exhaust conduit which stresses would attempt to spread apart the adjoining elbows 18, distort the casing 14 and shell 12 and create various other stress-related problems.

The ribs 70, 56 and 46 on the respective sections of the exhaust conduit 16 make a relatively small contact with the inner surface of the intermediate casing 14 so that heat from the respective sections 30, 32, 32, 34 is transmitted to the body 76 of the intermediate casing 14 in relatively narrow rings or bands by conduction which only transmits relatively small amounts of heat to the casing 14. The heat insulating air spaces 28 and 29 between the sections of the exhaust conduit 16 and casing 14 prevent or limit the amount of heat transmitted from the exhaust conduit 16 to the intermediate casing 14, thereby maintaining the temperature of the hot exhaust gases as high as is reasonably possible, thereby increasing energy supplied to the hot exhaust gas turbocharger. So as to maintain the outer skin of the manifold 10 below recommended limits, cooling fluid, such as cooling water, enters the cooling jacket 21 through boss 102 and through the coolant inlet flanges 20. The cooling fluid will flow in the cavity 104 of the elbow 26, in the cavity 21 between the outer shell 12 and the intermediate casing 14, and in the passage 118 between the walls 114 and 116 of the elbows 18 so as to maintain the outer tube 12 at a temperature preferably lower than 400° F. The cooling fluid will flow out the aperture 24 to the heat exchanger or other equipment for extracting the heat from the fluid.

The individual sections of the internal exhaust conduit 16 are designed to be substantially universal so that each manifold 10 will normally have one open-end section 34 and one closed-end section 30 with an appropriate number of center sections 32 to make up the total number of cylinders being serviced. The sections 30, 32 and 34 of the exhaust conduit 16 are made up of stainless steel, investment cast elements and, with the ribs or flanges 46, 56 and 70 formed thereon, create compartmentalized dead air spaces 28 between the sections of the exhaust conduit 16 and the intermediate casing 14 so as to provide heat insulation therebetween. The flanges 46, 56 and 70 are relatively short in an axial dimension so that only small rings of metal contact the internal surface of the body 76 of the intermediate casing 14, thereby relatively little heat is conducted directly from the sections to the intermediate casing. The limited amount of heat that is conducted through the rings of contact created by the flanges 46, 56 and 70 and the limited amount of heat that is transmitted through the dead air space 28 can easily be controlled by the cooling fluid, such as water, that circulates through the water jacket 21 created by the outer shell 12 and the intermediate casing 14. Due to the axial tolerances between the various sections of the exhaust conduit 16, there is never a problem aligning the apertures 38, 50 and 64 in the exhaust conduits 16 with the apertures 78 in the intermediate casing 14, so that the elbows 18 can be readily assembled through the apertures 78 and into the undercut portions surrounding the apertures 38, 50 and 64 of the respective sections of the exhaust conduit.

The outer shell 12 has the flattened planar portion 90 formed in one half 84 thereof which permits the manifold 10 to be assembled in a relatively tight fashion in the space provided between the appropriate parts of the engine. Bosses 144 are formed on the upper surface of the outer shell 12 for attaching the manifold 10 to the appropriate equipment.

The embodiments of the invention in which an exclusive property or privilege is claimed is defined as follows:

1. In an exhaust gas manifold for an internal combustion engine comprising a casing having axially spaced apart gas inlet apertures therethrough, in combination an internal exhaust conduit nested in said casing, said exhaust conduit comprising a plurality of sections, each section slidably interfitting with an adjoining section, radially disposed means between sections of the exhaust conduit and said casing to hold the sections in spaced relation from said casing and to form dead air spaces between said exhaust conduit and said casing, each said section having an aperture aligned with one of the gas inlet apertures in said casing with said slidable interfit between said sections accommodating thermal axial expansion to maintain said alignment between the apertures in said casing and said sections.

2. In an exhaust gas manifold as claimed in claim 1 including exhaust gas directing means passing through the aligned apertures in said casing and said sections, and an outlet elbow secured to said casing and having an exhaust passage communicating with said exhaust conduit to pass exhaust gases from the conduit to an external source.

3. In an exhaust gas manifold as claimed in claim 2 wherein said plurality of sections comprises a closed-end section, at least one center section and an open-ended section, said closed-end section and said at least one center section having a lip on one end portion for axially sliding contact in a socket in the adjoining sections, and said open-end section having a lip on one end portion for axially sliding contact in a sleeve of said outlet elbow.

4. In an exhaust gas manifold as claimed in claim 3 wherein a cap is secured over one end of said casing, said cap is spaced from the closed end of said closed-end section to form a dead air space therebetween.

5. In an exhaust gas manifold for an internal combustion engine comprising a casing having axially spaced apart gas inlet apertures therethrough, in combination an internal exhaust conduit nested in said casing, said exhaust conduit comprising a plurality of sections, each section slidably interfitting with an adjoining section, radially disposed means between at least one of said sections of the exhaust conduit and said casing to hold said section in spaced relation from said casing and to form dead air spaces between said exhaust conduit and said casing, wherein said radially disposed means between said exhaust conduit and said casing comprises a radially projecting flange on one end portion of each section, said flange contacting the interior of said casing to hold each section spaced from the interior of said casing, said flanges dividing the air space between said sections and said casing into a plurality of compartments, each said section having an aperture aligned with one of the gas inlet apertures in said casing with said slidable interfit between said sections accommodating thermal axial expansion to maintain said alignment between the apertures in said casing and said sections.

6. In an exhaust gas manifold as claimed in claim 1 including an outer shell surrounding said casing and being spaced therefrom to form a cooling fluid cavity therebetween, said shell having apertures aligned with the apertures in said casing and said conduit.

7. In an exhaust gas manifold as claimed in claim 2 wherein said gas directing means comprises a plurality of exhaust inlet elbows with one inlet elbow being connected to each section, each inlet elbow having one wall slidable with respect to said connected section of the exhaust conduit.

8. In an exhaust gas manifold as claimed in claim 6 wherein an outlet elbow has an exhaust passage communicating with said exhaust conduit, said outlet elbow has spaced sleeves defining a cavity therebetween, one sleeve is secured to said casing and the other sleeve is secured to said outer shell wherein said cooling fluid cavity between the casing and the shell communicates with said cavity in the outlet elbow whereby cooling fluid will flow through said cavities.

9. An exhaust gas manifold for an internal combustion engine comprising a casing having axially spaced apart apertures therethrough, a shell surrounding said casing and spaced therefrom to form a cooling fluid cavity therebetween, said shell being divided along its axis into two halves, cutouts formed in the mating edges of said halves, said halves being secured together whereby the cutouts form apertures aligned with the apertures in the casing, an internal exhaust conduit nested in said casing, flange means on said conduit engaging said casing to hold said conduit in spaced relation from said casing to form dead air spaces therebetween, said exhaust conduit having apertures aligned with the apertures in said casing and in said shell, a plurality of exhaust inlet elbows passing through the aligned apertures in said shell, casing and exhaust conduit, each inlet elbow having an inner wall spaced from an outer wall for defining a cavity therebetween, the inner wall of each inlet elbow sealed to said casing and the outer wall of each inlet elbow sealed to said shell with the cooling fluid cavity of the shell communicating with the cavity in each of the inlet elbows to provide cooling for said elbows, and an outlet elbow having spaced apart sleeves defining a cavity therebetween with one sleeve secured to said shell and the other sleeve secured to said casing with the cooling fluid cavity of said shell communicating with said cavity in said outlet elbow to provide cooling for said outlet elbow, said outlet elbow having an exhaust passage communicating with said exhaust conduit to pass exhaust gases from the exhaust conduit to an external location.

10. A method of making an exhaust manifold for an internal combustion engine which comprises the steps of:
(a) providing an intermediate elongate casing having apertures therein,
(b) inserting a plurality of interfitting, axially shiftable sections of an exhaust conduit into said casing with each said section of the exhaust conduit having an aperture aligned with one of the apertures in the casing,
(c) inserting an inlet elbow through each of the apertures in the casing and into a recess formed around each aperture in the exhaust conduit,
(d) securing each said elbow to the casing around the aperture therein,
(e) placing an end cap on one end of said casing,
(f) inserting the end portion of an inner wall of an outlet elbow between the end one of said exhaust conduit and the end of the casing,
(g) securing said wall of the outlet elbow to said casing,
(h) assembling one half of an outer shell partially around and in spaced relationship with said casing with cutouts in said one half nesting partially about each of said inlet elbows and with one end portion of the half contacting an outer wall of said outlet elbow,
(i) assembling a second half of said outer shell around and in spaced relationship with the remainder of said casing with cutouts in said second half nesting around the remainder of each of said inlet elbows and with one end portion of the half contacting the outer wall of said outlet elbow,
(j) securing said two halves together and to said outer wall of the outlet elbow and securing said halves to each of said inlet elbows to form a fluid cooling chamber between said shell and said casing,
(k) securing a plurality of fluid inlet flanges to said shell with the passage in each flange communicating through an opering in the shell with the fluid cooling chamber, and
(l) securing an end plate to the remote end of said shell with said end plate having an opening communicating with the fluid cooling chamber.

11. The method as claimed in claim 10 wherein said sections of the exhaust conduit include a closed-end section, at least one center section and an open-ended section with each section having a lip on one end portion which is slidably inserted in a socket in the adjoining section, with the lip on the open-ended section being slidably inserted in said inner wall of the outlet elbow.

12. A method of making an exhaust manifold for an internal combustion engine which comprises the steps of:
(a) inserting a plurality of axially, relatively movable, sections of an exhaust conduit into a casing with each said section of the exhaust conduit having an aperture aligned with an aperture in the casing, (b) assembling a plurality of exhaust gas inlet elbows through the apertures in the casing and into a recess formed around each aperture in the exhaust conduit,
(c) assembling an outlet elbow with the exhaust conduit and with the end of the casing,
(d) assembling an outer shell in spaced relationship with said casing and securing said shell to said inlet elbows and said outlet elbow, and
(e) securing fluid inlet flanges to said shell with a passage in each flange communicating with the space between the shell and the casing.

* * * * *